Patented Oct. 29, 1940

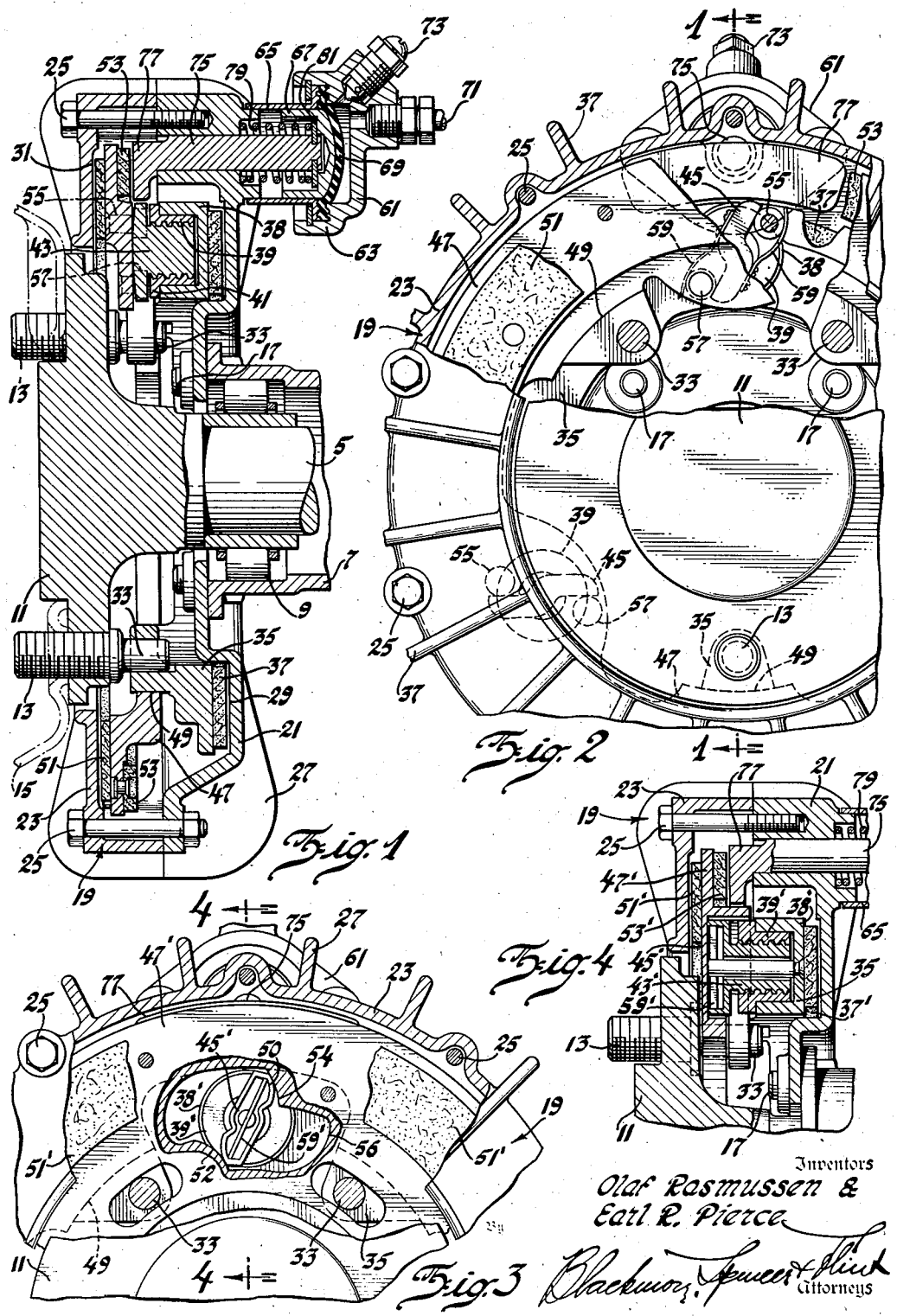

2,219,792

UNITED STATES PATENT OFFICE 2,219,792

DISK BRAKE

Olaf Rasmussen and Earl R. Pierce, Dayton, Ohio, assignors to General Motors Corporation, Detroit, Mich., a corporation of Delaware Application May 17, 1939, Serial No. 274,139

3 Claims. (Cl. 188—72)

This invention relates to brakes and particularly to disk brakes for vehicle wheels.

An object of the invention is to provide an improved operating mechanism whereby a mechanically applied force is supplemented by an automatically applied brake applying means.

Other objects and advantages will be understood from the following description.

On the drawing:

Figure 1 is a transverse section through one embodiment of the invention, the section being indicated by 1—1 of Figure 2.

Figure 2 is a view in elevation, partly broken away.

Figure 3 is a view in elevation, partly broken away and in section of another form.

Figure 4 is a section on line 4—4 of Figure 3.

Referring by reference characters to the drawing, a wheel driving shaft is marked 5. It is shown within a fixed housing 7, there being suitable bearings marked 9. Projecting from the enlarged end 11 of the live axle 5 are bolts 13 for supporting a wheel, a part only of which is shown at 15.

Suitable fastening means 17 are used to secure a brake drum 19 to the end of housing 7. The drum 19 is composed of two parts 21 and 23 secured together by bolts 25. External fins 27 may be used to facilitate cooling. The parts 21 and 23 have internal friction surfaces 29 and 31 respectively. Within the drum 19 are studs 33 which may be formed on the ends of bolts 13. Carried slidably on these studs is a friction disk 35 having a facing 37. At circumferentially distributed portions the disk 35 is formed with pockets 38 within each of which is a sleeve 39 having a rim 41 to engage the edge of the pocket. The sleeve is internally threaded to receive a threaded stud 43 having at one end a double cam 45.

A second friction disk 47 is rotatably supported as at 49 on disk 35. This second disk carries an annular friction facing 51 adapted to contact friction surface 31. It is provided on its other surface with a friction facing 53. At circumferentially spaced regions the disk 47 has pairs of pins 55 and 57 spaced both circumferentially and radially and adapted to engage the offset ends of the cams 45. Springs 59 are carried by the cam and overlie the pins as shown in Figure 2.

Adjacent one point in the circumference of the drum member 21 is a motor unit 61. It includes an outer head 63 and an inner cylinder 65. A piston 67 reciprocates in the inner cylinder. A diaphragm 69 is anchored peripherally between a surface of head 63 and a flange of cylinder 65.

Fluid from a master cylinder, not shown, is admitted to the head through inlet 71. Numeral 73 is an air bleed plug. Reciprocable through member 21 is a plunger 75 having an enlarged head 77 adapted to engage facing 53. A spring 79 seated against the member 21 surrounds the plunger and engages an abutment 81 carried thereby. This spring restores the plunger to the outer limit of its movement when the fluid pressure is released.

When fluid pressure is applied to the motor unit the plunger 75 engages facing 53 and the disk 47 is moved so that its facing 51 engages the drum surface 31. It should be remembered that disk 47 is rotating with disk 35. When it engages the drum, which is not rotating, its rotation is retarded so as to produce a relative rotation between disks 35 and 47. In the case of each cam, one or the other of adjacent pins 55 or 57, depending upon the direction of rotation, rotates the cam in response to the relative rotation. Each stud 43 is thereby threaded in its sleeve 39 and the reaction causes the several sleeves to push the disk 35 toward its drum face 29 and also causes the disk 47 to be pushed more forcibly against its drum face 31. It will be noted that since both pins move in the same circumferential direction that pin which is not functioning to rotate the cam is tensioning the spring 59. When the brake applying force is released, the stored up energy in the spring 59 reversely rotates the cam to its initial brake release position.

To avoid a changing torque relationship between the two disks when the angular relationship between the disks changes as a result of facing wear, the modifications shown in Figures 3 and 4 may be adopted. In this form the drum is made by securing together casing members 21 and 23 as before and the disk 47' has outer and inner friction rings marked 51' and 53'. The other disk 35 has a friction facing 37'. Disk 35 is formed with a plurality of pockets 38' within which are threaded sleeves 39' cooperating with threaded studs 43'. In place of cams 45 are cams 45' having tooth formed ends 50. Disk 47' is formed with recesses or depressions 56 which have bottom closure walls integral with the disk as shown. The side walls of the depressions have external tooth formations 52 and internal tooth formations 54 adapted to be engaged by the tooth formed ends 50 of the cams 45'. The depressions are dimensioned to provide for movement of the idle cam when the active end is operating. The teeth are shaped as involutes or other constant velocity forms whereby the mechanical advantage remains constant even if the friction facing becomes worn. In this form the pins 33 are located in slots in plate 47' to provide limited rotation. A modified form of spring 59' is used to restore the member 43'. By this means an improved action is secured and this form may be regarded as a refinement over that shown by Figure 1.

We claim:

1. In a wheel brake, a relatively fixed drum having opposed internal friction surfaces, disks within said drum, a first one of which is mounted to rotate with said wheel and to reciprocate into engagement with one of said drum surfaces, a second one of which is mounted to reciprocate to engage the other drum surface and to have limited rotation relative to the first disk, manually operable means operable solely to effect frictional engagement of said second disk with the drum surface to thereby effect relative rotation of said disks, cooperating means on said disks including a plurality of screw threaded members on one disk and a plurality of means on the other disk to rotate said last named members to spread said disks apart in response to their relative rotation.

2. The invention defined by claim 1, each of said threaded members having a double cam at one end and each of said last-named means comprising circumferentially and radially disposed pins to engage the faces of said cams.

3. The invention defined by claim 1, each of said threaded members having a double cam having a tooth formation at each end, and each of said last-named means including a slot embracing said cam, the walls of said slot engaging said tooth formations and having the outline of involute teeth.

OLAF RASMUSSEN.
EARL R. PIERCE.